US010592437B2

(12) United States Patent
Ndu et al.

(10) Patent No.: US 10,592,437 B2
(45) Date of Patent: Mar. 17, 2020

(54) MEMORY MATCHING KEY CAPABILITY

(71) Applicant: Hewlett Packard Enterprise Development LP, Houston, TX (US)

(72) Inventors: Geoffrey Ndu, Bristol (GB); Dejan S. Milojicic, Palo Alto, CA (US); Paolo Faraboschi, Sant Cugat (ES); Chris I. Dalton, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 253 days.

(21) Appl. No.: 15/664,101

(22) Filed: Jul. 31, 2017

(65) Prior Publication Data
US 2019/0034359 A1 Jan. 31, 2019

(51) Int. Cl.
*G06F 12/00* (2006.01)
*G06F 12/14* (2006.01)

(52) U.S. Cl.
CPC ...... *G06F 12/1475* (2013.01); *G06F 12/1466* (2013.01); *G06F 12/1491* (2013.01); *G06F 2212/1052* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 5,619,671 A | 4/1997 | Bryant et al. | |
| 5,787,309 A | 7/1998 | Greenstein et al. | |
| 7,424,584 B2 | 9/2008 | Mathews et al. | |
| 8,051,301 B2 | 11/2011 | Barnes et al. | |
| 2004/0255145 A1 | 12/2004 | Chow | |
| 2009/0249071 A1* | 10/2009 | De Atley | G06F 21/6218 713/171 |
| 2013/0269039 A1* | 10/2013 | Gold | G06F 21/64 726/27 |
| 2014/0304384 A1* | 10/2014 | Varenhorst | H04L 67/00 709/223 |
| 2015/0032986 A1* | 1/2015 | Moore | G06F 9/00 711/171 |

OTHER PUBLICATIONS

Witchel, E. et al.; "Mondrix; Memory Isolation for Linux Using Mondriaan Memory Protection"; Oct. 23, 2005; 14 pages.
(Continued)

*Primary Examiner* — Jason W Blust
(74) *Attorney, Agent, or Firm* — Michael A. Dryja

(57) ABSTRACT

Memory blocks are associated with each memory level of a hierarchy of memory levels. Each memory block has a matching key capability (MaKC). The MaKC of a memory block governs access to the memory block, in accordance with permissions specified by the MaKC. The MaKC of a memory block can uniquely identify the memory block across the hierarchy of memory levels, and can be globally unique across the memory blocks. An MaKC of a memory block includes a block protection key (BPK) stored with the memory block, and an execution protection key (EPK). If a provided EPK for a memory block matches the memory block's BPK upon comparison, access to the memory block is allowed according to the permissions specified by the MaKC.

12 Claims, 4 Drawing Sheets

(56) References Cited

OTHER PUBLICATIONS

Achermann, R. et al., "Separating Translation from Protection in Address Spaces with Dynamic Remapping", Paper accepted for publication at HotOS XVI, Whistler, BC, Canada, May 7-10, 2017.
"IEEE Computer Society Predicts Top 9 Technology Trends for 2016", available online at <https://www.computer.org/web/pressroom/technology-trends-2016>, Dec. 15, 2015, 5 pages.
"Rack-scale Computing", (Dagstuhl Seminar 15421), Dagstuhl Reports 5(10): 35-49 (2015), 15 pages.
Amdahl et al., "Architecture of the IBM System/360", IBM Journal of Research and Development, vol. 8, Issue 2, Apr. 1964, pp. 87-101.
Cheri, Capability Hardware Enhanced RISC Instructions (CHERI) available online at <https://web.archive.org/web/20170725120901/http://www.cl.cam.ac.uk/research/security/ctsrd/cheri/>, Jul. 25, 2017, 4 pages.
InfiniBand Architecture Specification vol. 1 Release 1.3, Mar. 3, 2015, 1842 pages.
Miller et al., "Capability myths demolished", Technical Report SRL2003-02, Johns Hopkins University Systems Research Laboratory, vol. 5, 2003, 15 pages.
Singhania et al., "Capability Management in Barrelfish", 2017, available online at <http://www.barrelfish.org/publications/TN-013-CapabilityManagement.pdf>, 47 pages.

\* cited by examiner

FIG 2

MaKC | KEY 202 | PERMISSIONS 204 | BASE 206 | LENGTH 208 | OFFSET 210

MaKC | KEY 202 | PERMISSIONS 204 | BASE 206 | LENGTH 208 | OFFSET 210 | TIMESTAMP 210 | FINGERPRINT 210

300

MEMORY MATCHING KEY CAPABILITY

BACKGROUND

Computing devices generally employ randomly accessible memory when executing program code, such as processes and process threads of such code. Randomly accessible memory is memory that can be accessed in any order—that is, randomly—and is also known as random-access memory. Random-access memory traditionally has been volatile, meaning that the memory loses its contents when power is removed from the memory, but more recently non-volatile random-access memory has been developed. Owing to its traditionally volatile nature, random-access memory is usually employed to temporarily store program code and the data operated on and generated by such program code, as opposed to for longer-term or archival storage purposes.

BRIEF DESCRIPTION OF THE DRAWINGS

FIG. 2 is a diagram of an example in-memory format of an MaKC for a memory block.

FIG. 3 is a diagram of an example in-transit format of an MaKC for a memory block.

DETAILED DESCRIPTION

Figure 1:
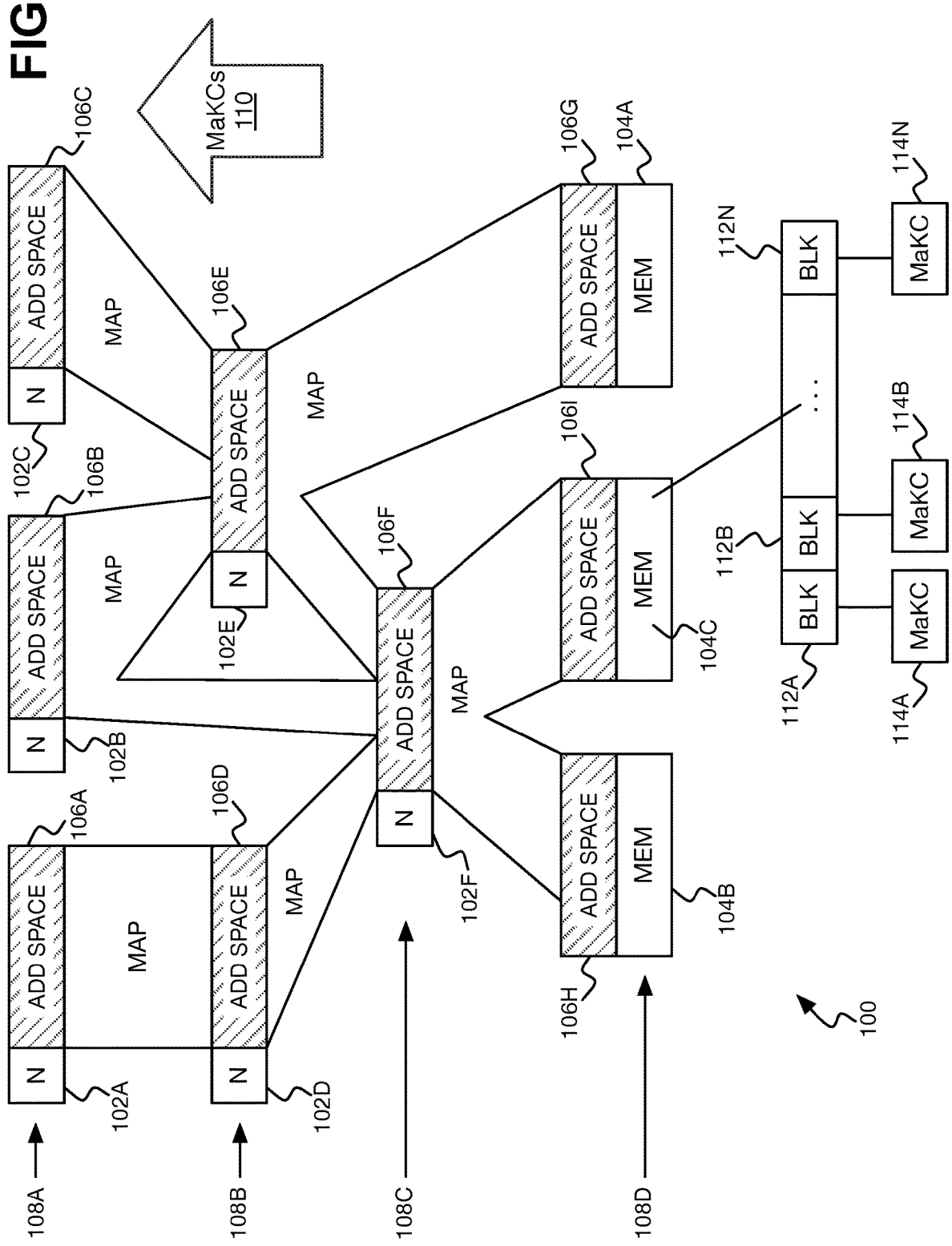
FIG. 1 is a diagram of an example system including a hierarchy of memory levels over which address spaces are defined in a layered manner and through which matching key capabilities (MaKCs) of memory blocks can be propagated in a bottoms-up manner.

As noted in the background section, computing devices employ random-access memory when executing program code. Such memory is accessed in accordance with an addressing scheme or space. Traditionally, memory has been accessed according to a lowest level address space, by which the actual physical or real memory devices have their individual memory cells accessed by program code.

More recently, virtual memory addressing schemes have been used, in which physical memory addresses are mapped to virtual memory addresses that the program code uses to access the contents of the actual memory devices. Virtual memory addressing permits functionality such as virtual machines, for instance, to be realized. A virtual address space may be considered as a simple memory level hierarchy, in which a virtual address space is mapped to an underlying physical address space.

More recently still, more complex memory level hierarchies have been developed. For instance, there may be three or more memory levels within a hierarchy. An address space at one memory level may be mapped to the address spaces of one or more immediately lower memory levels. The actual memory devices that store data are located at the lowest memory levels within the hierarchy, and each higher-level address space ultimately maps down to the address spaces of one or more of these lowest levels.

Memory level hierarchies in which an address space at one memory level may not directly map to address spaces of the lowest memory levels at which the memory devices actually storing data reside but instead directly maps to address spaces of intervening memory levels are usually found in large-scale computing system designs. Examples of such large-scale computing system designs include rack-scale system architectures. A rack-scale system can include a large number of hardware nodes that are tightly coupled by fast optical interconnect technologies. Within a rack-scale system, there may be petabytes—i.e., thousands of terabytes—of random-access memory that is byte addressable by any hardware node of the system. Therefore, a rack-scale system provides for larger amounts of memory than more conventional computing systems can provide.

A capability-based memory system decouples address translation from protection. This means that how a particular memory block is addressable is independent of the permissions governing access to the memory block. A capability-based system enforces the security and integrity of memory within the system, by ensuring that just authorized program code or hardware nodes are permitted to access memory. However, capability-based systems typically cannot extend beyond simple virtual address space-to-physical address space mapping. That is, capability-based systems have not been able to accommodate complex memory level hierarchies in which the underlying physical memory mapping is dynamic or indirect. This limitation restricts the usage of capability-systems in conjunction with rack-scale systems.

Described herein are techniques providing matching key capability (MaKC) that can scale to rack-scale systems or other systems that employ complex memory level hierarchies. The MaKC approaches described herein can be utilized even when an address space of one memory level is directly mapped to address spaces of immediately lower memory levels at which physical memory does not reside. For instance, the MaKC approaches can be employed even when the address space of a memory level directly maps to an address space of an intermediary memory level that itself directly maps to an address space of a lowest memory level at which physical memory resides. The MaKC approaches described herein can be utilized in the context of dynamic memory mapping, in which how an address space at a memory level is mapped to address spaces at successively lower levels is not static, and can change.

FIG. 1 architecturally depicts an example system 100, which may be a rack-scale system. The system 100 includes hardware nodes 102A, 102B, 102C, 102D, 102E, and 102F, which are collectively referred to as the hardware nodes 102. The system 100 also includes physical memory devices 104A, 104B, and 104C, which are collectively referred as to the memory devices 104. The hardware nodes 102 and the memory devices 104 can be communicatively networked with one another via optical interconnects, for instance.

The hardware nodes 102 may be processing nodes that include processors like central-processing units (CPUs), as well as other hardware, but which may not include memory that is byte-addressable by other nodes within the system 100. The memory devices 104 are special types of nodes, which include memory that is byte-addressable by other nodes within the system 100. In the nomenclature of FIG. 1, the hardware nodes 102 may include physical memory, but such memory is not byte-addressable by other nodes. The memory devices 104 may also include processing devices, but do have memory that is byte-addressable by other nodes.

The hardware nodes 102 and the physical memory devices 104 respectively have memory address spaces 106A, 106B, 106C, 106D, 106E, 106F, 106G, 106H, and 106I as depicted in FIG. 1, and which are collectively referred to as the memory address spaces 106. The address spaces 106 are organized within a hierarchy of memory levels 108A, 108B, 108C, and 108D, from a top-most memory level 108A to a bottom-most memory level 108D, which are collectively referred to as the memory levels 108. The physical memory devices 104 are associated with the bottom most, memory-residing memory level 108D, which is a memory-residing memory level in that byte-addressable physical memory resides and is directly addressable at the level 108D. The hardware nodes 102 are associated with other, non-memory-residing memory levels 108A, 108B, and 108C, which are non-memory-residing memory levels in that byte-addressable physical memory does not reside at the levels 108A, 108B, and 108C.

The hardware nodes 102 (as well as the memory devices 104) can have a many-to-one correspondence to the memory levels 108. For instance, there are three nodes 102A, 102B, and 102C at the memory level 108B. There are two nodes 102D and 102E at the memory level 108B, and one node 102F at the memory level 108C. There are three memory devices 104 at the memory level 108D.

The physical memory of the physical memory devices 104 is directly (byte-) addressable at the memory address spaces 106G, 106H, and 106I. The other memory address spaces 106A, 106B, 106C, 106D, 106E, and 106F ultimately relate to the physical memory of the physical memory devices 104, via direct and indirect mapping onto the memory address spaces 106G, 106H, and 106I. That is, the address spaces 106 of the non-memory-residing memory levels 108A, 108B, and 108C are layered and are defined in a bottom-up manner within the hierarchy of memory levels 108.

For instance, in the example of FIG. 1, the memory address space 106F is layered on and maps to the memory address spaces 106H and 106I of the memory-residing memory level 108D. This means that a portion of the address space 106F is defined in relation to the physical memory of the physical memory device 104B and another portion is defined in relation to the physical memory of the physical memory device 104C. The memory address space 106E is layered on and maps to this address space 106F, as well as to the memory address space 106G of the memory-residing memory level 108D. This means a portion of the address space 106E is defined in relation to the physical memory of the physical memory device 104A, and another portion is defined in relation to the physical memory of one or more of the physical memory devices 104B and 104C (indirectly, through the address space 106F).

The memory address space 106C is layered on and maps to the memory address space 106E. This means that the address space 106C is defined in relation to the physical memory of the physical memory device 104A (indirectly, through the memory space 106E), and/or in relation to the physical memory of one or more of the physical memory devices 104B and 104C (indirectly, through the memory spaces 106E and 106F). The memory address space 106B is layered on and maps to the memory address spaces 106E and 106F. This means that the address space 106B is defined in relation to the physical memory of the physical memory device 104A (indirectly, through the memory space 106E), and/or in relation to the physical memory of one or more of the physical memory devices 104B and 104C (indirectly, through the memory space 106F, and/or through the memory spaces 106E and 106F). The memory address space 106A is layered on and maps to the memory address space 106D. This means that the address space 106A is defined in relation to the physical memory of one or more of the physical memory devices 104B and 104C (indirectly, through the memory spaces 106D and 106F).

The layering, definition, and mapping of the memory address spaces 106 relative to one another is dynamic, and can be adjusted over time. For example, as depicted in FIG. 1, the address space 106E is layered on and maps to the address spaces 106F and 106G. However, the address space 106E may be later adjusted so that it maps just to the address space 106G, and not to both the address spaces 106F and 106G. As another example, as depicted in FIG. 1, the address space 106A is layered on and maps to the address space 106D, but may be adjusted so that it maps to either or both the address spaces 106E and 106F.

Each physical memory device 104 includes memory blocks that actually store data. In FIG. 1, this is specifically indicated in example relation to the memory device 104C, as including memory blocks 112A, 112B, . . . , 112N, which are collectively referred to as the memory blocks 112. The memory blocks 112 are depicted in FIG. 1 as being of the same (i.e., fixed) size, but they may be of different (i.e., dynamic or variable) size as well. Each memory block 112 includes actual physical cells of the memory device 104 that can store bits of data. Thus, a memory block 112 may be defined as storing a number of bits, bytes, or more of data.

The memory blocks 112 respectively have MaKCs 114A, 114B, . . . , 114N, which are collectively referred to as the MaKCs 114. As noted above, and as delineated in detail later in the detailed description, the MaKC 114 of a memory block 112 governs access to the data stored in the memory block 112 in accordance with permissions specified by the MaKC 114. The MaKC 114 of a memory block 112 particularly governs access to the block 112 regardless of the address space 106 that is being used to specify the memory block 112. The MaKCs 114 are globally unique across the memory blocks 112. That is, an MaKC uniquely identifies its associated memory block across the hierarchy of the memory levels 108. Regardless of which physical memory device 104 a given memory block is a part, and regardless of which address space 106 is being used to specify the memory block, the MaKC of the memory block can be unique.

The MaKCs propagate upwards from the memory-residing memory level 108D through the hierarchy of memory levels 108 (i.e., through the non-memory-residing memory levels 108C, 108B, and 108A), as indicated by the arrow 110. Stated another way, the memory address spaces 106 reverse-inherit the MaKCs on a memory level-by-memory level basis upwards through the hierarchy memory level 108, beginning at the memory-residing memory level 108D. The address spaces 106G, 106H, and 106I at the memory-residing memory level 108D thus initially have the MaKCs, since the address spaces 106G, 106H, and 106I directly address the physical memory of the physical memory devices 108 of which the memory blocks are a part.

The memory address space 106F reverse-inherits the MaKCs of at least a portion of the memory blocks of the physical memory devices 104B and 104C from the memory address spaces 106H and 106I, because the address space 106F is layered on the address spaces 106H and 106I. The memory address space 106E reverse-inherits the MaKCs of at least a portion of the memory blocks of the physical memory device 04A, because the address space 106E is layered on the address space 106G. The memory address space 106E also reverse-inherits the MaKCs of at least a portion of the memory blocks addressed by the memory address space 106F, because the address space 106E is layered on the address space 106F as well.

The memory address space 106D reverse-inherits the MaKCs of at least a portion of the memory blocks addressed by from the memory address space 106F, because the address space 106D is layered on the address space 106F. The memory address space 106C reverse-inherits the MaKCs of at least a portion of the memory blocks addressed by the memory address space 106E, because the address space 106C is layered on the address space 106E. The memory address space 106B reverse inherits the MaKCs of at least a portion of the memory blocks addressed by each of the memory address spaces 106E and 106F, because the address space 106B is layered on the address spaces 106E and 106F. The memory address space 106A reverse inherits the MaKCs of at least a portion of the memory blocks addressed by the memory address space 106D, because the address space 106A is layered on the address space 106D.

That the of the memory address spaces 106 are layered within the hierarchy of memory levels 108, and that the MaKCs of the memory blocks of the physical memory devices 104 propagate and reverse-inherit from the memory residing memory level 108D upwards through the non-memory residing memory levels 108 can accommodate any changes in the definition of the address spaces 106. For example, if the address space 106E is redefined so that it maps just to the address space 106G and no longer maps to the address space 106F in addition to the address space 106G, this means that which memory blocks are addressed within the address space 106E changes from those of the physical memory device 104A and one or more of the physical memory devices 104B and 104C to just those of the memory device 104A. Since MaKCs of the memory blocks propagate and reverse-inherit upwards, the MaKCs of the memory blocks now addressed by the address space 106E originate from the address space 106G (i.e., from the physical memory device 104A that the address space 106G directly addresses). Therefore, access integrity of the memory blocks within the system 100 via the MaKCs is maintained.

As noted above, each memory block is identifiable within the system 100 by its MaKC regardless of the address space used to specify the memory block. Access security is thus maintained across the system 100, because no matter at which node 102 at which memory level 108 a memory block is being accessed, the MaKC governing access to the memory block remains the same. A node 102 that misidentifies a memory block by address in an attempt to gain access to the memory block will be unsuccessful if it does not have the memory block's MaKC, since MaKCs are associated with memory blocks at the memory block level and not at the address space level.

In implementation, a memory management unit (MMU) or other controller or hardware component at each node 102 can maintain a protection table to manage the MaKCs associated with the memory blocks that are addressed by the address space 106 of the node. The MMU may already maintain a table to translate memory addresses from the address space 106 of the node 102 of which the MMU is a part to the address space(s) 106 on which its address space 106 is layered. The protection table thus stores the MaKCs of the memory blocks, by the addresses of the address space 106 of the node 102 or the address space(s) on which this address space 106 is layered. For example, the MMU of the node 102A may already maintain a table to translate memory addresses from the address space 106A to the address space 106D. A comparable protection table storing the MaKCs of the memory blocks, either by the addresses of the address space 106A or 106D, may thus be maintained as well.

Therefore, when an address space 106 changes in definition, the MaKCs of the memory blocks are propagated upwards through the hierarchy of memory levels 108 to update the protection tables of the hardware nodes 102. For example, the address space 106F may be modified so that it maps onto just the address space 106H and not also onto the address space 106I. Because of this change, new MaKCs are propagated to the node 102F associated with the address space 106F, and stored in the protection table thereof. This in turn results in the MaKCs being propagated, for instance, to the address space 106D of the node 102D, at which a protection table is updated. From the node 102D, the MaKCs are propagated upwards to the node 102A, which updates its own protection table.

FIG. 2 shows an example in-memory format of an MaKC 200 for a memory block. There is an MaKC 200 for each memory block of each memory device 104 within the system 100. The format of the MaKC 200 in FIG. 2 is an in-memory format in that the format depicted in FIG. 2 is how the MaKC 200 is stored at the memory device 104 including the memory block in question. Stated another way, the MaKC 200 of a given memory block is stored at the memory device 104 including the given memory block.

The MaKC 200 includes a key 202, permissions 204, a base address 206, a length 208, and an offset 210. The key 202 uniquely identifies the memory block to which the MaKC 200 pertains, globally across the system 100. The key 202 may be referred to as a block protection key (BPK). The permissions 204 govern how the contents of the memory block to which the MaKC 200 are accessible in accordance with the MaKC 200. For instance, the permissions 204 can include read-only, write-only, and both read-and-write permissions. A memory block that is read-only can have its contents read but not written to; a memory block that is write-only can have its contents written to but not read; and a memory block that is both read-and-write can both be written to and read from.

The base address 206 of the MaKC 200 specifies a base address within the memory address space 106 of the memory device 104 of which the memory block is a part (i.e., a memory address space 106 associated with the memory residing memory level 108D). The offset 210 specifies the beginning location of the memory block from the base address 206 within this memory address space 106. Therefore, the base address 206 plus the offset 210 is the beginning address of the memory block within the memory address space 106 in question. The length 208 specifies the number of bytes that are a part of the memory block starting at this beginning address. Because the length 208 can vary on a per-MaKC basis, each memory block can therefore have a different size.

When a hardware node 102 of the system 100 requests a memory block, the request specifies the memory block by its MaKC. The request transitions downwards within the hierarchy of memory levels 108 until the request reaches the memory device 104 within the memory residing memory level 108D that includes the requested memory block. Therefore, the request traverses at least one pair of memory levels 108, including a non-memory residing memory level 108 immediately above the memory residing memory level 108D and the memory residing memory level 108D itself. If the request originated at a non-memory residing memory level 108 that is not immediately above the memory residing memory level 108D, then the request traverses one or more pairs of non-memory residing memory levels 108 as well.

When a memory block request is sent from a memory level 108 to an immediately lower memory level 108, the request is sent from a hardware node 102 to another hardware node 102 or to a memory device 104 over a communication transport interconnecting the former hardware node 102 to the latter hardware node 102 or to the memory device 104 in question. This communication transport may be trusted, or secure. In this case, the MaKC specified in the memory block request can be identical to that of the in-memory format of FIG. 2. This is because it can be trusted that the MaKC has not been maliciously altered while undergoing transport.

However, if the communication transport is untrusted, or insecure, then the MaKC specified in the memory block request can differ from that of the in-memory format of FIG. 2. It cannot be trusted that the MaKC has not been maliciously altered while undergoing transport. Therefore, a different, in-transit format of the MaKC can be employed when the MaKC is being transported between memory levels 108 over an untrusted or insecure communication format. This in-transit format can be in the form of additional fields added to the in-memory format of FIG. 2, for instance.

FIG. 3 shows such an example in-transit format of an MaKC 300 for a memory block. The MaKC 300 includes the key 202, the permissions 204, the base address 206, the length 208, and the offset 210 that have been described in relation to the in-memory format of FIG. 2. The MaKC 300 also includes a timestamp 312 and a fingerprint 314. As the MaKC 300 moves to lower memory levels 108 of the hierarchy, the timestamp 312 can be updated using a one-way hash function applied to the current time when a hardware node 102 sends the MaKC 300 to a lower memory level 108. Such updating of the timestamp 312 can help prevent replay and other types of malicious attacks.

The fingerprint 314 can be a cryptographically secure authentication code, such as a hash-based message authentication code (HMAC). The hardware node 102 at which the memory block request including the MaKC 300 originates generates the fingerprint 314. At each memory level 108 in which a hardware node 102 or a memory device 104 receives the MaKC 300, the fingerprint 314 is regenerated and compared against that originally generated and stored as part of the MaKC 300. Therefore, each recipient of the MaKC 300 (i.e., a memory device 104 and zero or more hardware nodes 102) can verify that the MaKC 300 has not been altered during transport.

The hardware nodes 102 and the memory devices 104 within the system 100 are trusted to one another, even if the communication transports interconnecting the nodes 102 and the devices 104 are not. Each hardware node 102 and memory device 104 may thus have access to a unique algorithm or secret key that in combination with other fields of the MaKC 300 (such as the key 202, the permissions 204, the base 206, the length 208, and/or the offset 210) by which the fingerprint 314 can be generated. In this way, the hardware nodes 102 and the memory devices 104 can confirm that a received MaKC 300 has not been altered in transport.

As noted above, the in-transit format of a MaKC can be different from the in-memory format of the MaKC by the addition of additional fields to the in-memory format, as specifically depicted in FIG. 3. In such an implementation, the memory device 104 that ultimately receives the in-transit MaKC 300 can therefore generate the in-memory MaKC 200 by just removing the added fields that are unique to the in-transit MaKC 300. For instance, removing the fields 312 and 314 from the in-transit MaKC 300 yields the in-memory MaKC 200.

Figure 4:
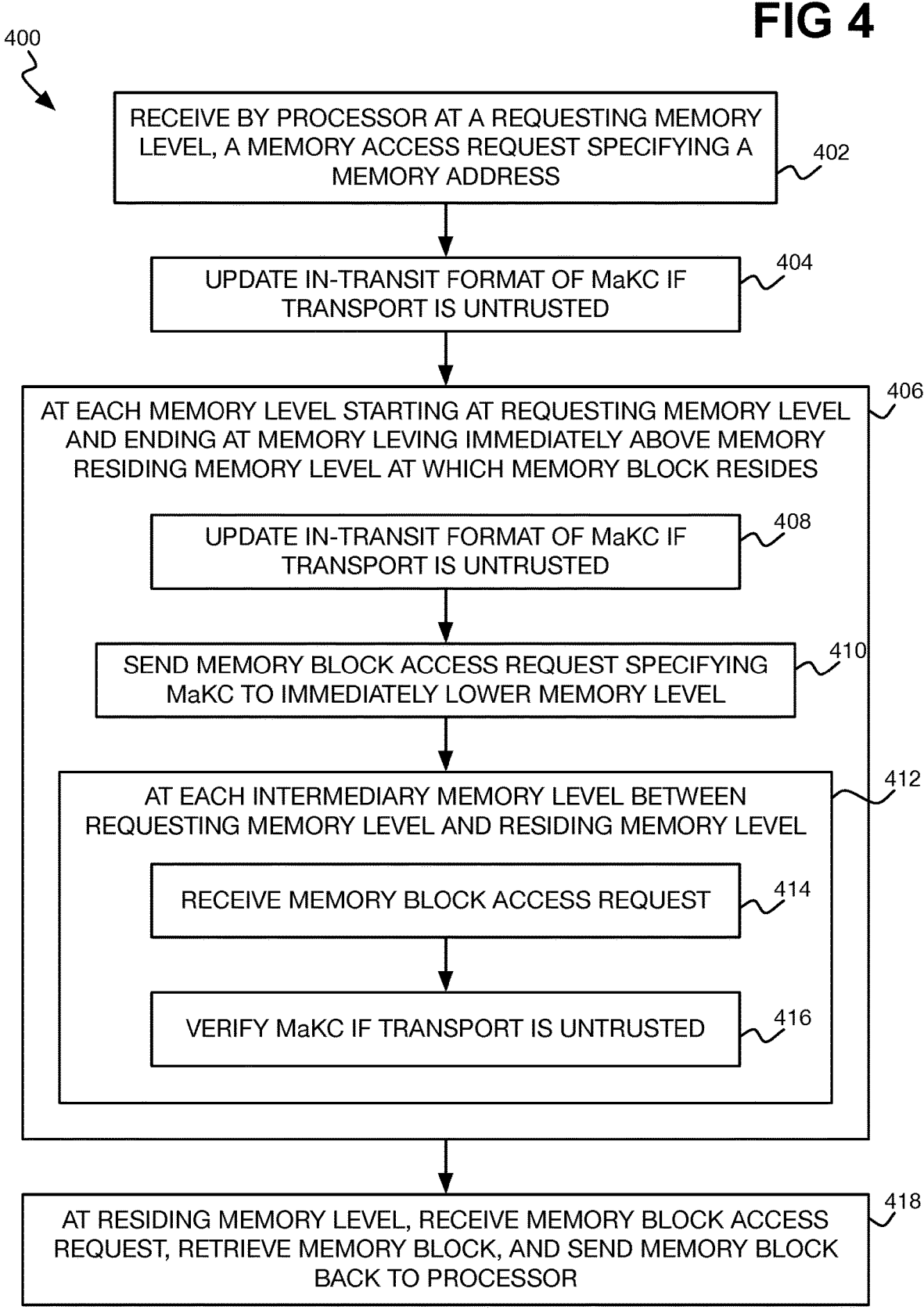
FIG. 4 is a flowchart of example method of how a memory block access request transitions downward through a hierarchy of memory levels to reach a memory that stores the requested memory block.

FIG. 4 shows an example method 400 depicting how a memory block access request transitions downward through the hierarchy of memory levels 108 to reach the memory device 104 at the memory residing memory level 108D that stores the requested memory block. A hardware node 102, such as a processor at the node 102, receives a memory access request that specifies a memory address (402). For instance, a process or a process thread may request to read from or write to memory at a memory address. The memory level 108 of the node 102 at which the request is generated and received is referred to the requesting memory level 108. The memory address is in the address space 106 associated with the hardware node 102.

The hardware node 102, such as the processor thereof, determines the memory block to which the memory address maps (404). That is, the hardware node 102 determines the MaKC of the memory block specified by the memory address. For instance, the MaKC can be retrieved using a protection table, as noted above.

The following occurs starting at the requesting memory level 108 and ending at the memory level 108 immediately above the residing memory level 108D at which the memory block resides (406). If the requesting memory level 108 is itself immediately above the residing memory level 108D, then part 406 is performed once. If there is one intervening memory level 108 between the requesting memory level 108 and the residing memory level 108D, then part 406 is performed twice; if there are two intervening levels 108 between the requesting level 108 and the residing level 108D, then part 406 is performed three times; and so on.

The in-transit format of the MaKC is updated if the communication transport between the current memory level 108 and the immediately lower memory level 108 is untrusted (408). This updating can be performed at a hardware node 102. The memory block access request, including the MaKC as may have been updated in part 410, is sent to the immediately lower memory level 108 (410). Specifically, the transmission is performed from the hardware node 102 that currently has the request, and is sent to a hardware node 102 or a memory device 104 at the immediately lower memory level 108. The identification of this recipient hardware node 102 or memory device 104 can be made by using a translation table at the sending hardware node 102 mapping the address space 106 associated with the sending node 102 to another address space 106. The hardware node 102 or memory device associated with this latter address space 106 is the recipient of the request.

For instance, the address space 106A maps to the address space 106D; therefore, the hardware node 102A associated with the space 106A sends a received request to the hardware node 102B associated with the space 106D. As another example, the address space 106F maps to the address spaces 106H and 106I. The recipient is the memory device 104B associated with the memory space 106H or the memory device 104C associated with the memory space 106I depending on whether the memory address of the memory block that is the subject matter of the request maps to the space 106H or to the space 106I.

The following is performed at each intermediary memory level 108 between the requesting memory level 108 and the residing memory level 108D (412). Part 412 is not performed, therefore, if the memory access request is generated at the memory level 108C immediately above the residing memory level 108D, since there is no intermediary memory levels 108 between the memory levels 108C and 108D. Likewise, part 412 is not performed when the current memory level is the memory level 108C.

The memory block access request is received at a hardware node 102 at such an intermediary memory level 108 (414). As part of the request, the hardware node 102 may receive the memory address of the requested memory block in its associated memory space 106, in addition to the MaKC of this memory block. However, if the hardware node 102 does not receive this memory address, then the hardware node 102 can retrieve the memory address within its address space 106 from the MaKC. For instance, the protection table mapping an address space 106 to MaKCs of memory blocks by memory address within the space 106 may also reverse-map the MaKCs to memory addresses within the address space 106.

Once the hardware node 102 at the intermediary memory level 108 receives the memory block access request, including the MaKC, the node 102 may verify the communication transport over which the request was received if the transport is untrusted (416). If verification fails, then performance of the method 400 prematurely terminates. Assuming verification succeeds, though, performance of the method 400 continues. For instance, the receiving hardware node 102 at the intermediary memory level 108 performs parts 408 and 410 that have been described.

Ultimately, at the residing memory level 108D, the memory device 104 that stores the requested memory block is received (418). The memory device 104 can retrieve the memory block, including the MaKC as stored by the memory device 104 for the memory block. The memory device 104 may itself authenticate the memory request, as described next in the detailed description, before sending the memory block back to the processor of the hardware node 102 that received the request in part 402, upwards back through the hierarchy of memory levels 108. In another implementation, the memory device 104 may send the memory block, such as at least its MaKC, to this requesting hardware node 102 for the node 102 itself to perform authentication of the request. Ultimately, assuming authentication succeeds, the request is processed: either data is read from the memory block and provided to the process or process thread that requested the memory block, or data is written to the memory block in accordance with the request.

The MaKC has been described as including a key 202 in FIGS. 2 and 3, which has been described as a BPK. The BPK is the part of an MaKC that is stored with the MaKC, at the memory device 104 including the memory block to which the MaKC pertains. The BPKs of MaKCs are physically located in a part of the memory device 104 that cannot be accessed as regular memory data by instructions. Rather, the BPKs are accessible and manipulated by trusted instructions. Trusted instructions can be part of program code that is loaded into memory controlled by a master key different than the BPKs, or instructions that a trusted processor, MMU, and so on, can execute. The MaKC of a memory block is therefore inaccessible by untrusted program code.

BPKs of MaKCs can be cached by hardware, like a processor or MMU, to improve performance, such as by using a buffer like a translation lookaside buffer (TLB). When the system 100 starts, the memory blocks of the physical memory device 104 may be marked as master key blocks, which can be accessed by processes and process threads that have the master key. Code in memory blocks that are subsequently marked as not being master key blocks can access master key blocks by jumping or branching to a trusted mode using appropriate instructions to entry points of designated gateway blocks, which are master blocks that can be transitioned to. The destination of such a jump or branch is marked as a gateway block to be such an entry point. A gateway block is specified by code executing in a master key block.

An MaKC has, in addition to a BPK, an execution protection key (EPK). While like the BPK of an MaKC the EPK is associated with the MaKC, unlike the BPK, the EPK is not stored as part of the MaKC. Rather, the EPKs can be part of the registers of a hardware device like a processor or MMU of a hardware node 102, and can be associated with threads executed by this hardware device. On a memory access, the hardware device compares an EPK against a retrieved BPK of an MaKC of a desired block. Access is permitted when the EPK matches the BPK.

Figure 5:
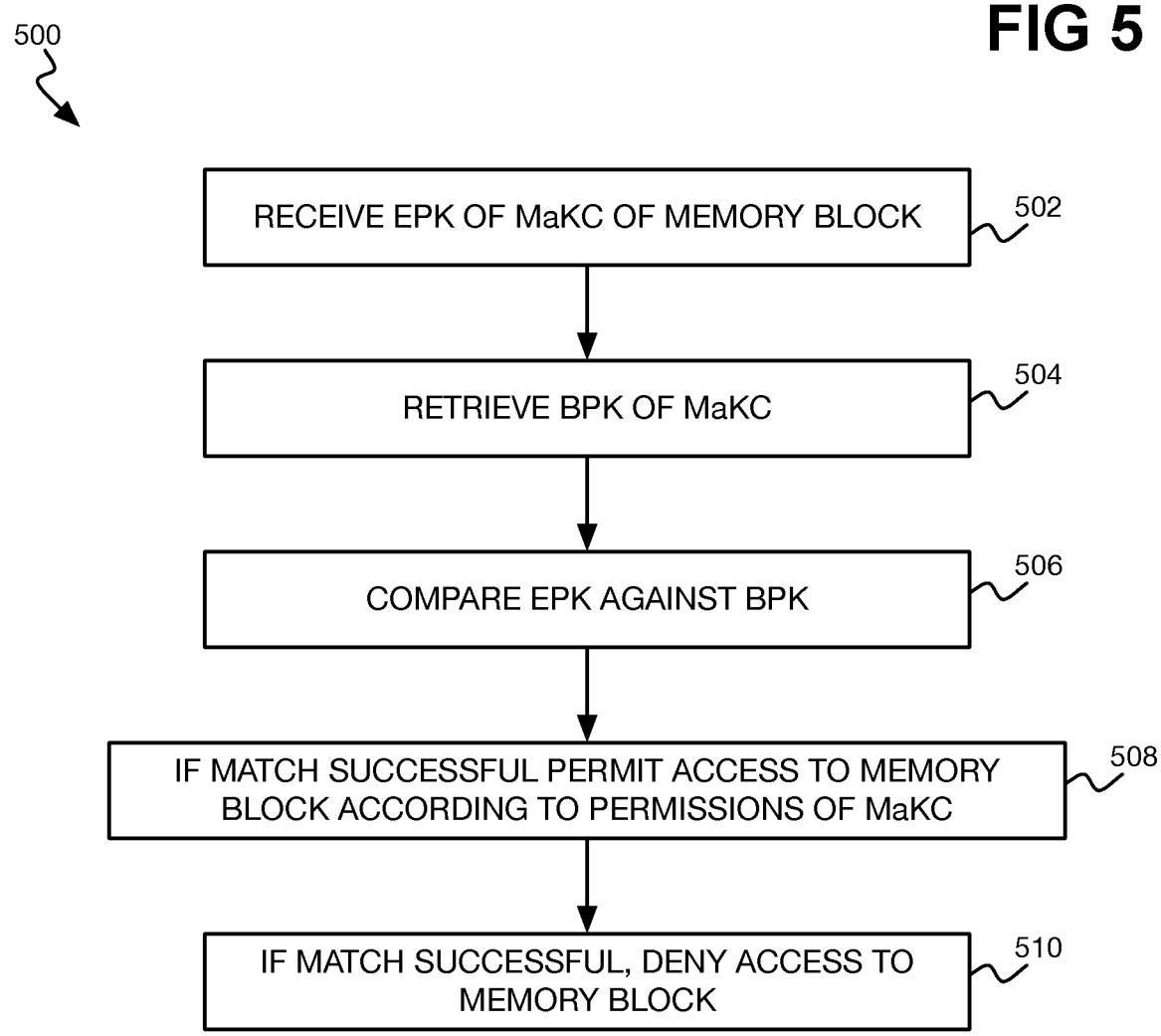
FIG. 5 is a flowchart of an example method by which access to a memory block is governed by an MaKC associated with the memory block.

FIG. 5 shows an example method 500 by which access to a memory block is governed by an MaKC associated with the memory block. The method 500, like other methods described herein, can be implemented by program code that a hardware device executes from a non-transitory computer-readable data storage medium. This implementation can be via a general-purpose CPU, as well as special-purpose hardware devices like field-programmable gate arrays (FPGAs), application-specific integrated circuits (ASICs), and so on. The hardware device may be a processor or MMU of a hardware node 102 executing a hardware thread having an EPK of an MaKC, for instance, a memory management controller (MMC) of the physical memory device 104 including the real (i.e., actual) memory including the memory block, and so on.

The hardware device receives an EPK of an MaKC of a memory block (502). If the hardware device is a processor or MMU of a hardware node 102, for instance, the EPK may be part of the registers of the processor or MMU. If the hardware device is an MMC of a physical memory device 104 including the memory block in question, the EPK may be received from a hardware node 102 over the memory levels 108 of the hierarchy, in a manner as has been described in relation to FIG. 4.

The hardware device retrieves the BPK of an MaKC of the memory block (504). If the hardware device is a processor or MMU of a hardware node 102, the BPK is retrieved from the physical memory device 104 including the memory block in question over the memory levels 108 of the hierarchy, in a manner consistent with that which has been described in relation to FIG. 4. If the hardware device is an MMC of the physical memory device 104 including the memory block, the BPK is retrieved from the memory device 104 itself.

If the EPK matches the BPK, then access to the memory block by the hardware node 102 requesting access to the memory block is permitted in accordance with the permission afforded by the MaKC to the memory block (508), such as read-only, write-only, or read-and-write access. The EPK may be considered as matching the BPK using any of a number of different authentication schemes. For instance, the EPK and BPK may be related as public-private cryptographic digital keys or other types of cryptographic digital key pairs.

If the EPK does not match the BPK, then access to the memory block by the hardware node 102 requesting access is denied (510). If the matching is performed at the hardware node 102 itself, such as by a processor or MMU thereof, then the process or process thread originating the memory block access request can be informed of the matching result (successful or unsuccessful) by this hardware device directly at the node 102. If the matching is performed at the physical memory device 104 including the memory block in question, then this process or process thread can be informed of the matching result by the memory device 104 communicating the result to the hardware node 102 executing the process or process thread, over the memory levels 108 of the hierarchy, in a manner consistent with that which has been described in relation to FIG. 4.

Figure 6:
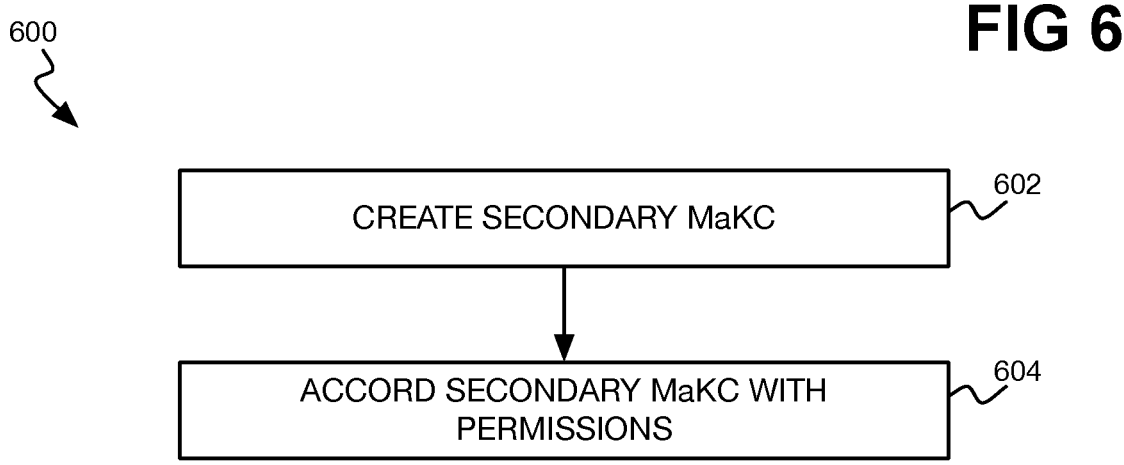
FIG. 6 is a flowchart of an example method by which permissions associated with an MaKC can be delegated, such as from a first user to a second user.

FIG. 6 shows an example method 600 by which permissions associated with an MaKC of a memory block can be delegated. A secondary MaKC for a memory region overlapping the memory block is generated (602). The memory region may be a sub-memory block of the memory block, or may be a supra-memory block of the memory block, in which case the memory region contiguously encompasses at least partially more than one memory block. It is noted that the delegator performing the method 600 has to have the MaKC of each memory block that the memory region at least partially overlaps to generate a secondary MaKC for the memory region. The secondary MaKC (i.e., the memory region thereof) is accorded with permission no greater than the MaKC of the memory block itself (604).

More specifically, the permissions accorded to the memory region are no greater than the least permissions accorded to any memory block that the memory region overlaps. For example, a memory region may overlap two memory blocks. If the MaKC of one memory block provides for read-and-write access, and the MaKC of the other memory block provides just for read access, then the permissions accorded to the memory region have to be read-only.

Any hardware device—i.e., a processor, MMU, or MMU at any hardware node 102 and any physical memory device 104—at any memory level 108 of the hierarchy in which the memory block(s) overlapped by the memory region are addressed by an associated address space 106 has access to the secondary MaKC. This means that any such hardware device has access to the memory region in accordance with the permissions created by the secondary MaKC. Furthermore, these hardware devices can also modify the secondary MaKC—i.e., modify the permissions of the MaKC by which the memory region is accessible—and also revoke the secondary MaKC, so that the permissions no longer exist with respect to the secondary MaKC vis-à-vis the memory region.

The techniques that have been described herein provide for a capability-based memory system. This capability-based memory system is scalable to rack-scale systems and other systems that have complex memory hierarchies. As such, the benefits associated with decoupling address translation from memory protection are achievable even in the context of rack-scale and similar systems.

We claim:

1. A non-transitory computer-readable data storage medium storing program code executable by a hardware device to:
   receive an execution protection key (EPK) of a matching key capability (MaKC) of a memory block associated with a memory level of a hierarchy of memory levels at which the memory block actually exists;
   retrieve a block protection key (BPK) of the MaKC of the memory block;
   compare the EPK against the BPK to determine whether the EPK matches the BPK; and
   in response to the EPK matching the BPK, permit access to the memory block in accordance with permissions of the MaKC of the memory block, wherein:
      each memory level has a plurality of memory addresses, the memory addresses of each memory level except for a lowest memory level mapping to the memory addresses of an immediately lower memory level,
      the hardware device resides at a given memory level within the hierarchy of memory levels, wherein the MaKC of the memory block is a master MaKC, and wherein the program code is executable by the hardware device to further:
         create a secondary MaKC of a memory region overlapping the memory block; and
         accord the secondary MaKC with permissions no greater than the permissions of the memory block MaKC of the memory block,
         wherein any hardware device at any memory level of the hierarchy of memory levels in which the memory block is addressed has access to the secondary MaKC, including revocation and modification of the secondary MaKC, upon creation of the secondary MaKC of the memory region.

2. The non-transitory computer-readable data storage medium of claim 1, wherein the program code is executable by the hardware device to further:
   in response to the EPK not matching the BPK, deny any access to the memory block.

3. The non-transitory computer-readable data storage medium of claim 1, wherein the BPK is globally unique across a plurality of memory blocks including the memory block.

4. The non-transitory computer-readable data storage medium of claim 1, wherein the program code executed by the hardware device is trusted program code,
   wherein the MaKC of the memory block is inaccessible by untrusted program code.

5. The non-transitory computer-readable data storage medium of claim 1, wherein the memory block is one of a plurality of memory blocks, the memory blocks of variable size.

6. The non-transitory computer-readable data storage medium of claim 1, wherein the hardware device executing the program code is processor executing a hardware thread having the EPK.

7. The non-transitory computer-readable data storage medium of claim 1, wherein the hardware device executing the program code is a memory management controller (MMC) controlling real memory including the memory block.

8. A method comprising:
   receiving, by a processor associated with a requesting memory level of a hierarchy of memory levels, a memory access request specifying a memory address within a memory address space associated with the requesting memory level;
   determining, by the processor, a memory block to which the memory address maps, the memory block including a matching key capability (MaKC) uniquely identifying the memory block across the hierarchy;
   at each memory level of the hierarchy starting at the requesting memory level and ending at an ending memory level immediately above a residing memory level at which the memory block actually resides, sending a memory block access request specifying the MaKC of the memory block to an immediately lower memory level; and at the residing memory level, receiving the memory block access request from the ending memory level and retrieving the memory block, wherein when a communication transport between any memory level and an immediately lower memory level is untrusted, the MaKC of the memory block specified in the memory block access request has a format that differs from a format of the MaKC of the memory block as stored at the residing memory level.

9. The method of claim 8, wherein the requesting memory level is not immediately above the residing memory level, and wherein the method further comprises:

at each intermediary memory level of the hierarchy between the requesting memory level and the residing memory level, receiving the memory block access request from an immediately higher memory level prior to sending the memory block access request to the immediately lower memory level.

10. The method of claim 8, wherein the format of the MaKC specified in the memory block access request comprises:

a timestamp updated at each memory level sending the memory block access request; and an authentication fingerprint generated at each memory level sending the memory block access request and verified at each memory level receiving the memory block access request, wherein the format of the MaKC of the memory as stored at the residing memory level excludes the timestamp and the authentication fingerprint.

11. The method of claim 10, wherein the format of the MaKC of the memory as stored at the residing memory level is identical to the format of the MaKC specified in the memory block access request other than exclusion of the timestamp and the authentication fingerprint.

12. The method of claim 8, wherein a format of the MaKC of the memory block comprises:

a block protection key (BPK) of the memory block that is globally unique across a plurality of memory blocks including the memory block; and permissions governing access to the memory block.

* * * * *